United States Patent [19]
Charny et al.

[11] Patent Number: 6,047,328
[45] Date of Patent: *Apr. 4, 2000

[54] METHOD AND APPARATUS FOR ALLOCATING A TRANSMISSION RATE TO SOURCE END NODES IN A NETWORK

[75] Inventors: Anna Charny, Sudbury, Mass.; K. K. Ramakrishnan, Berkley Heights, N.J.

[73] Assignees: Cabletron Systems, Inc., Rochester, N.H.; AT&T Corporation, New York, N.Y.

[*] Notice: This patent is subject to a terminal disclaimer.

[21] Appl. No.: 09/016,604

[22] Filed: Jan. 30, 1998

Related U.S. Application Data

[63] Continuation of application No. 08/622,801, Mar. 27, 1996, Pat. No. 5,745,697.

[51] Int. Cl.$^7$ .................................................. G06F 13/00
[52] U.S. Cl. ........................ 709/233; 709/232; 370/232; 370/235
[58] Field of Search ................................... 709/223, 224, 709/225, 232, 233, 235, 238, 249; 370/229, 232, 235, 236, 238

[56] References Cited

U.S. PATENT DOCUMENTS

| | | | |
|---|---|---|---|
| 5,276,677 | 1/1994 | Ramamurthy et al. | 370/232 |
| 5,402,426 | 3/1995 | Foglar et al. | 370/60 |
| 5,546,377 | 8/1996 | Ozveren | 370/13 |
| 5,633,859 | 5/1997 | Jain et al. | 370/234 |
| 5,638,371 | 6/1997 | Reychaudhuri et al. | 370/347 |
| 5,649,110 | 7/1997 | Ben-Nun et al. | 370/351 |

OTHER PUBLICATIONS

*ATM Forum, "Straw Vote for the UNI Signaling Specification" Version 4.0, Jan. 5, 1996, pp. 1–293.

*ATM Forum, "Traffic Management Specification", 95–0013R10, Straw Vote, Feb. 1996, pp. 1–115.

*ATM Forum, "Traffic Management Specification", Version 4.0, af–95–0113R11, Mar. 1996, pp. 1–101.

Primary Examiner—Viet D. Vu
Attorney, Agent, or Firm—Wolf, Greenfield & Sacks, P.C.

[57] ABSTRACT

An apparatus controls the transmission rates of a plurality of end stations in a computer network, and the network has at least one intermediate node. The intermediate node has a plurality of virtual circuits passing therethrough, where the virtual circuits are established between the end stations. The end stations transmit data packets at a plurality of discrete transmission rates. The end stations transmit data packets containing a field having transmission rate information. The intermediate node reads the transmission rate information for the virtual circuits, by the intermediate node detecting the transmission rate information in the field of a data packet which it receives. The intermediate node counts the number of virtual circuits using each of the discrete transmission rates. The intermediate node maintains an indication that a selected virtual circuit has been counted, and for not counting the virtual circuit more than once during a switch time interval. The intermediate node calculates a rate allocation value for the plurality of virtual circuits, and writes the rate allocation value into the field of the data packet in order to signal to the end station, and any intervening intermediate node, the calculated rate allocation value. A bit is stored in the intermediate node for each virtual circuit, each bit is initialized to a first value at the beginning of a switch time interval, and the bit is assigned a second value when a data packet having transmission rate information is detected in the selected virtual circuit by the intermediate node.

12 Claims, 10 Drawing Sheets

TRANSMISSION OF RM
CELL BY A
SOURCE END STATION

FIG. 5

RM CELL
TRANSMISSION
PROCESS
(BLOCK 506)

DATA STRUCTURE MAINTAINED
BY AN INTERMEDIATE NODE

FIG. 8B

| VC | B BIT |
|----|-------|
| V1 | 1,0 |
| V2 | . |
| . | . |
| . | . |
| VN | 1,0 |

FIG. 8C

FIG. 8A, 8B, 8C
DATA STRUCTURES MAINTAINED BY
AN INTERMEDIATE NODE

FIG. 9

DETAIL OF BLOCK 920

METHOD AND APPARATUS FOR ALLOCATING A TRANSMISSION RATE TO SOURCE END NODES IN A NETWORK

This is a continuation of Ser. No. 08/622,801 filed Mar. 27, 1996 now U.S. Pat. No. 5,745, 697.

FIELD OF THE INVENTION

This invention relates generally to operation of computer networks, and more particularly to maintaining flows of information packets through an intermediate link of the network with a large number of flows passing through the intermediate link.

BACKGROUND OF THE INVENTION

As computer networks become increasingly more complex, more and more end stations communicate through more and more intermediate links. An intermediate link is typically a section of network cable with nodes or network switches at each end of the cable. A link can carry only a predetermined amount of network traffic, usually expressed as a bit per second limit. Network traffic is typically referred to as packets or cells, and each packet or cell requires a number of bits to be transmitted over the network.

For example, an intermediate link may carry traffic originating at numerous source end stations. And each source end station may be capable of generating network traffic at a rate in excess of what the intermediate link can handle without dropping packets. That is, each individual end station may be capable of driving an intermediate link into congestion. Accordingly, when a plurality of end stations are creating network traffic, and all of that traffic passes through a particular intermediate link, it is clear that a mechanism must be installed to limit the traffic created by the source end stations. Flow control is the generic term used to describe a mechanism to limit traffic created by source end stations.

A bottleneck resource is a link, or a switch, etc. which limits the flow through the network.

Recently, end to end rate based flow control schemes have been gaining popularity, especially in ATM networks (for background information see User-Network Interface Specification Version 4.0, The ATM Forum, known as the UNI 4.0 Specification, all disclosures of which are incorporated herein by reference). The goal of a rate based flow control scheme is to determine a rate at which a flow can transmit data so that the bottleneck resource is shared in a fair and efficient manner.

There has been considerable work on congestion management in high speed networks in the recent past, using rate based congestion/flow control schemes, which operate either in an end-to-end framework or on a hop-by-hop basis. The use of rate based flow control schemes, with all of the sources cooperating in order to maintain a smooth rate of flow of data from each of them, has the promise of significantly reducing the buffer requirements in the switches. Much of this work has been in the context of ATM, especially for the ABR (Available Bit Rate) service. The ABR service is typically used for data transfer, and is considered to be lower priority than the other classes of service such as CBR (Constant Bit Rate) and VBR (Variable Bit Rate). Left over bandwidth from the use of a resource (link, switch or end-system) by CBR and VBR is used for ABR service. Therefore, the timely use of the available resources by ABR without causing congestion (that may result either in significantly increase dequeueing delay or cell loss) is an important goal. Another equally important goal is to ensure that the resources in the network are shared in a 'fair and equitable' manner.

End-to-end rate schemes, as well as the dynamic buffer allocation in a hop-by-hop credit based scheme, use the transmission rate as the meaningful characteristic of a flow. This has also been the basis of past work in packet networks with high bandwidth-delay products, with the focus on determining the rate at which a flow must transmit data so that a bottleneck's capacity is shared fairly and efficiently among the flows utilizing the bottleneck.

A definition of "fairness" is the notion of Max-Min fairness, which has been adopted in the ATM Forum for congestion management of the ABR service.

In general, explicit rate schemes work as follows: Resource Management (RM) cells (or probes) are sent from, and received by, the sources to determine the explicit rate at which the sources may transmit. Switches determine a rate allocation value based on local information and on the information provided to them in RM cells, and return this rate allocation value back to the source explicitly in the RM cells.

A goal of computation at the switch is to compute Max-Min rate allocation value based on the information which the switch receives from traffic through the switch, particularly information received from an RM cell.

There are several ways of computing the Max-Min fair rate allocation value for a flow in a network of multiple resources and multiple flows with different resource demands.

A straightforward computation of Max-Min fair rate allocation value requires state information for each virtual circuit, that is "per VC state". And so the calculation must scan all VCs per "RM cell time", and this may be a prohibitive amount of calculational work. There have been many attempts to overcome this complexity in calculation, but such attempts typically come at the price of degrading the convergence properties necessary for stable operation of the network.

There is needed a computational method for allocating transmission rate to source end nodes, and which both reduces the computational complexity, and reduces the state information which must be retained concerning each VC, without significantly degrading convergence properties for the network. Also, the computational method should be useful with either interval based or proportional schemes of flow control.

SUMMARY OF THE INVENTION

There is described a computational method and apparatus for allocating transmission rate to source end nodes, and which both reduces the computational complexity, and reduces the state information which must be retained concerning each VC, without significantly degrading convergence properties for the network. Also, the computational method is useful with either interval based or proportional schemes of flow control, as long as in a proportional scheme an upper bound is imposed on the interval between RM cell transmissions.

An apparatus to control the transmission rate of a plurality of source end stations in a computer network, and the network having at least one intermediate node, is described, as follows. A plurality of virtual circuits is established between the source end stations and the destination end stations. The plurality of virtual circuits passes through the intermediate node. The source end stations periodically transmit data packets at a plurality of discrete transmission rates. A data packet contains a field having transmission rate information. The intermediate node learns the transmission rate information for each virtual circuit by the intermediate node detecting the transmission rate information in the field of a data packet received by the intermediate node. Alternatively, the transmission rate information is carried in special control packets, that is, RM cells. And there are means in the intermediate node for counting the number of virtual circuits using each of the discrete transmission rates. Also, there is means in the intermediate node for maintaining an indication that a selected virtual circuit has been counted in the steps above, and for not counting the virtual circuit more than once during a switch time interval. There is means in the intermediate node, responsive to the counting of the number of virtual circuits using each discrete transmission rate, for calculating a rate allocation value for the plurality of virtual circuits. The calculation is done periodically during the switch time interval. Finally, there is a means for writing the rate allocation value into the field of the data packet, or field of a RM cell, in order to signal to the source end station, and any intervening intermediate node, the rate allocation value calculated hereinabove.

The apparatus as above further maintains a bit in the intermediate node for each virtual circuit. Each bit is initialized to a first value at the beginning of a switch time interval. The bit is assigned a second value by the intermediate node when a data cell having transmission rate information is detected by the intermediate node. The apparatus further has a means for not duplicating the counting of a virtual circuit when the data cell is detected in a virtual circuit having the bit set to the second value.

Each intermediate node in the network is permitted to have a different switch allocation interval. Also, each source end station is permitted to have a different interval for timing the transmission of the data packets having transmission rate information.

Other and further aspects of the present invention will become apparent in the course of the following description and by reference to the accompanying drawings.

BRIEF DESCRIPTION OF THE DRAWINGS

Referring now to the drawings, in which like numerals represent like parts in the several views.

DETAILED DESCRIPTION

Higher Level Description

In the present discussion, ATM terminology is utilized. In ATM terminology, the packet carrying rate information is a special control packet referred to as the Resource Management cell, or RM cell. However, the invention is applicable to a wide variety of computer networks where the rate information is carried in general data cells.

The present invention provides an intermediate node which uses the RM cells which it detects in order to perform a "Max-Min fairness" rate allocation value calculation. That is, the intermediate node uses the information which it detects on the network.

In a preferred embodiment of the invention, the transmission rates which may be used by source end stations are defined as a discrete set of rates.

As an example, the rates Nr (i) may be calculated from an expression such as:

$$2^{0.125 \cdot i}$$

In this expression i is the index of the rate. In an example where i has the values of 0 through 256, the allowed rates have a dynamic range of through:

$$2^0 = 1$$
$$2^{0.125 \cdot 256} = 2^{32} = 4.3 \: 10^9$$

A finer mesh of transmission rates, but less dynamic range could be achieved by using transmission rates given by:

$$2^{0.0625 \cdot i}$$

which for i=0 to 256 gives a dynamic range of from 1 to 65,536.

Alternatively, a coarser mesh of transmission rates, but with a wider dynamic range could be obtained by using the expression:

$$2^{0.25 \cdot i}$$

which for 1=0 to 256 gives a dynamic range of from 1 to 1.8 $10^{19}$.

Also, many other choices are available for choosing the discrete transmission rates.

Once a virtual circuit connection has been established between a source end station and a destination end station, the sources send Resource Management cells, RM cells, through the virtual circuit. And the RM cells are returned to the sources by the destinations re-launching the RM cell to the source. These RM cells are used to probe the network and receive feedback of the appropriate transmit rate for the flow. As the RM cell traverses the network, it accumulates the smallest rate allocation value permitted by the network, and returns it back to the source.

RM cells are sent by a source end station in proportion to the number of data cells transmitted, and at least periodically once per interval TRM. TRM is the source end station timing interval for transmission of RM cells. In the present description, each source end station may have a different value of TRM, and a source end station may change its value of TRM during operation.

The switch performs its rate allocation value computation at least once per interval TSW.

This framework encompasses the two most popular types of flow control schemes: a proportional system, in which control traffic is proportional to the regular data traffic, and an interval-based system, in which control traffic is sent at fixed time intervals.

An RM cell of a flow contains two rate fields, denoted CCR (current cell rate) and ER (explicit rate). The ER field is set by the source to its demand, or, if demand is not known, to the link rate. When the RM cell leaves the source, the CCR field contains the current rate the source is allowed to transmit at. As the RM cell traverses the network, the switches reduce both the CCR and the ER fields of the RM cells down to the current value of the switch rate allocation value.

Detailed Description

Figure 1:
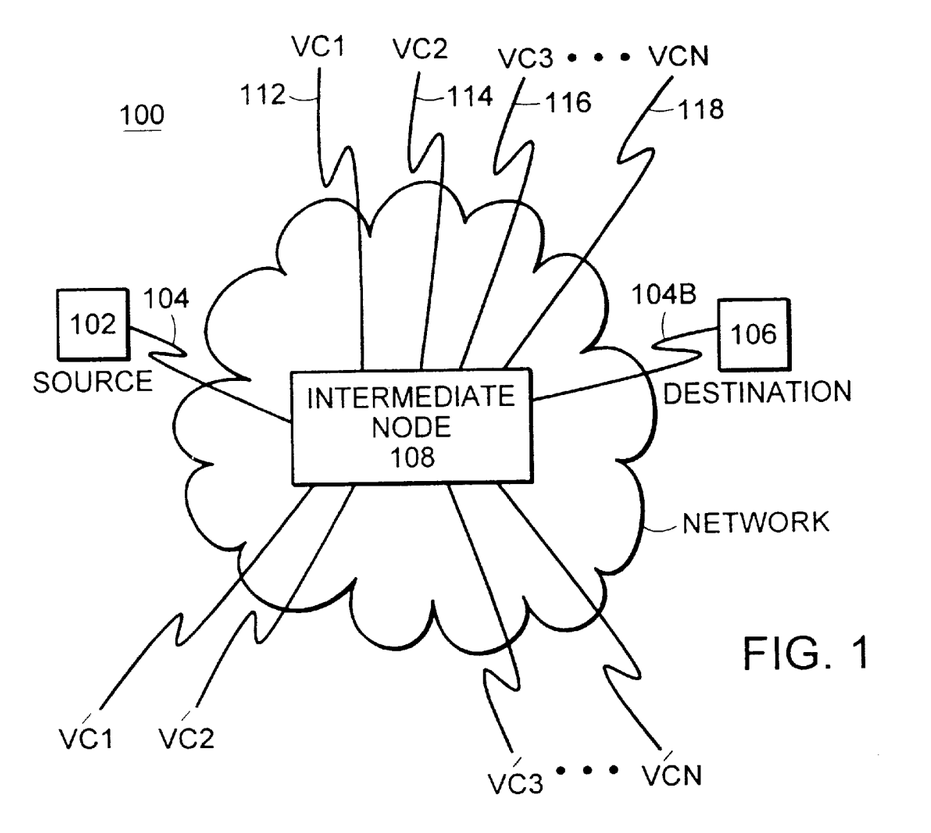
FIG. 1 is a high level diagram of a computer network.

Turning now to FIG. 1, there is shown a representative network 100. Source end station 102 is connected through virtual circuit 104, (hereinafter a virtual circuit may be referred to as a VC), to destination end station 106. The downstream link of VC 104 is indicated as VC 104B. VC 104 passes through one or more intermediate nodes, and one of the intermediate nodes is shown in network 100 as intermediate node 108. Numerous other virtual circuits pass through VC 108 as indicated, including VC1 112, VC2 114, VC3 116, and possibly a further plurality of virtual circuits up to and including VCN 118. N is a number representing the number of virtual circuits passing through intermediate node 108. N may have a value between 0 and a very large number. For example, there may be many thousands of virtual circuits passing through intermediate node 108, and so N may be as large as several hundred thousand (several 100,000).

Figure 2:
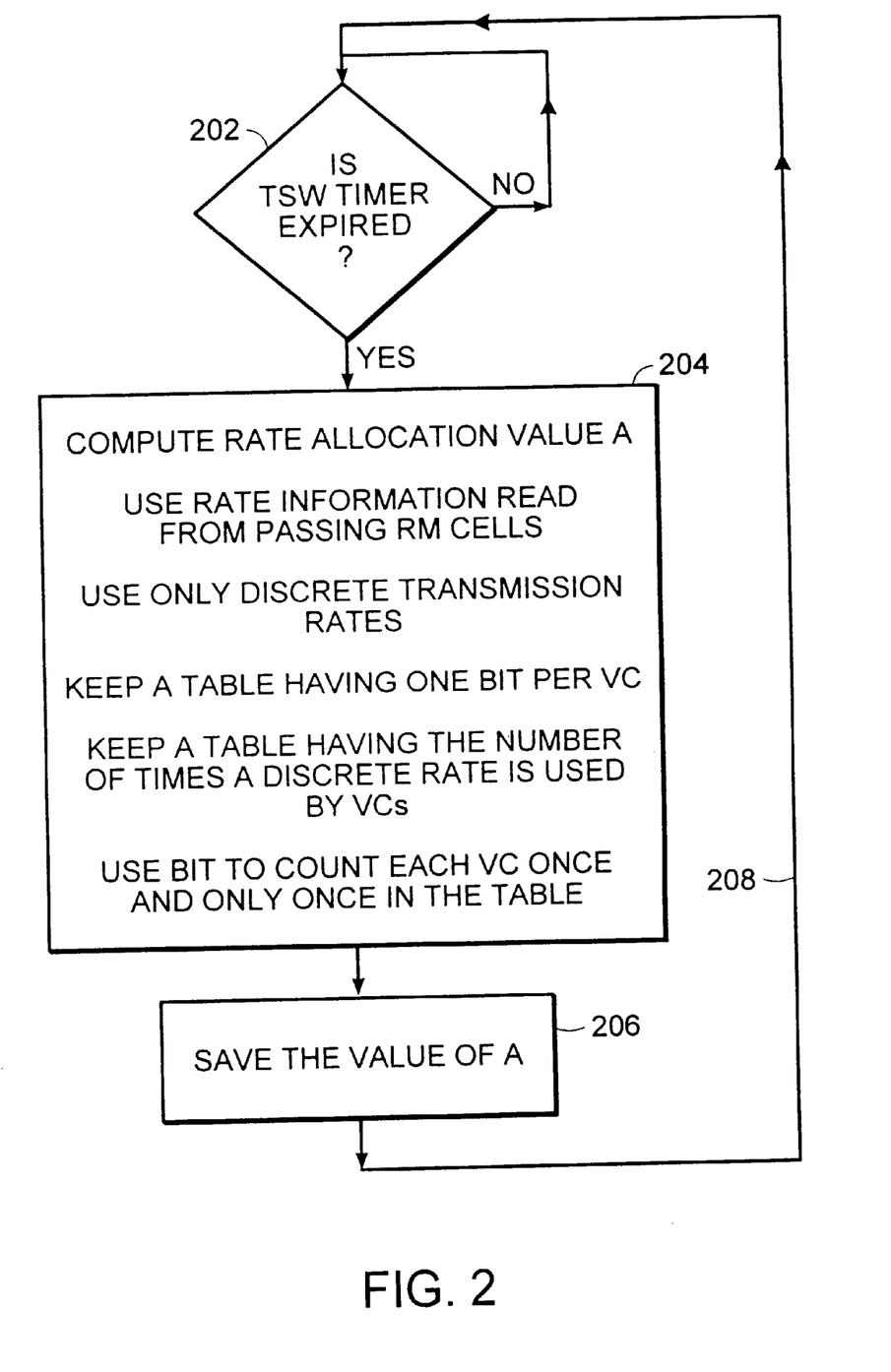
FIG. 2 is a high level flow diagram for a rate allocation value calculation.

Turning now to FIG. 2, there is shown a higher level flow diagram of the invention. At block 202 an intermediate node waits for expiration of a time interval TSW for re-calculation of the node rate allocation value A. After the time interval TSW expires, the process goes to block 204 where a new value of rate allocation value A is computed. As taught by the invention, a bit is maintained by the intermediate node for each VC in order to show whether or not an RM cell in each VC has been detected during the time interval TSW. Also, a table having an entry for each discrete transmission rate is maintained, and for each rate a counter is updated for each rate whenever a RM cell having that rate written into its fields is received by the intermediate node. The bit prevents counting any VC more than once during any time interval TSW.

The rate allocation value is then calculated in block 204, as shown herein-below, using the equations and method discussed in reference to FIG. 11. The process then goes to block 206 where the new value of rate allocation value A is stored in memory of the intermediate node. For example, the value of A may be stored in field 802 of FIG. 8A. The process then returns along path 208 to wait at decision block 202 for expiration of the next time interval TSW.

Figure 3:
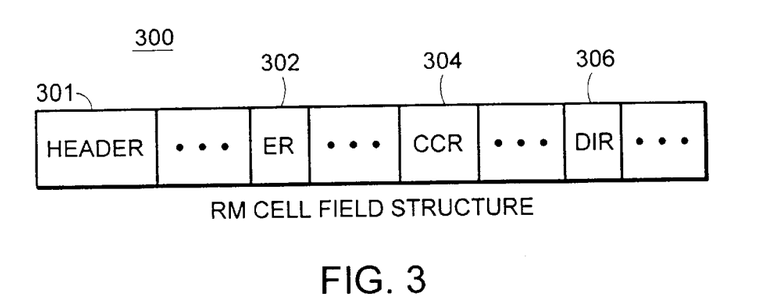
FIG. 3 is a field diagram of a RM cell.

Turning now to FIG. 3, there is shown a partial field structure 300 of a RM cell, (a RM cell is an abbreviation for Resource Management Cell). Header 301 is a standard cell header which permits a cell to travel from a source end station, along a designated virtual circuit, to a destination end station.

Field ER 302 carries transmission rate information from an end station to an intermediate node, and also from intermediate nodes in the network to a source end station.

Field CCR 304 carries transmission rate information from a source end station to intermediate nodes in the network.

Field DIR 306 is a flag indicating whether the RM cell is traveling in a forward direction from a source end station to a destination end station, or whether the RM cell is travelling in reverse from a destination end station to a source end station. In an exemplary embodiment, the DIR field 306 may be a single bit, where a value of "1" indicates a RM cell travelling in the forward direction from a source end station to a destination end station; and, a value of "0" indicates a reverse RM cell travelling from a destination end station to a source end station.

After a virtual circuit has been established, a source end station 102 transmits its first RM cell. The RM cell is prepared: with the ER field 302 set equal to the lesser of Demand or the Link Rate; and, the CCR field 304 set equal to the rate at which the end station is actually transmitting.

Alternatively, the fields ER, CCR, and DIR can be carried in general data packets.

Figure 4:
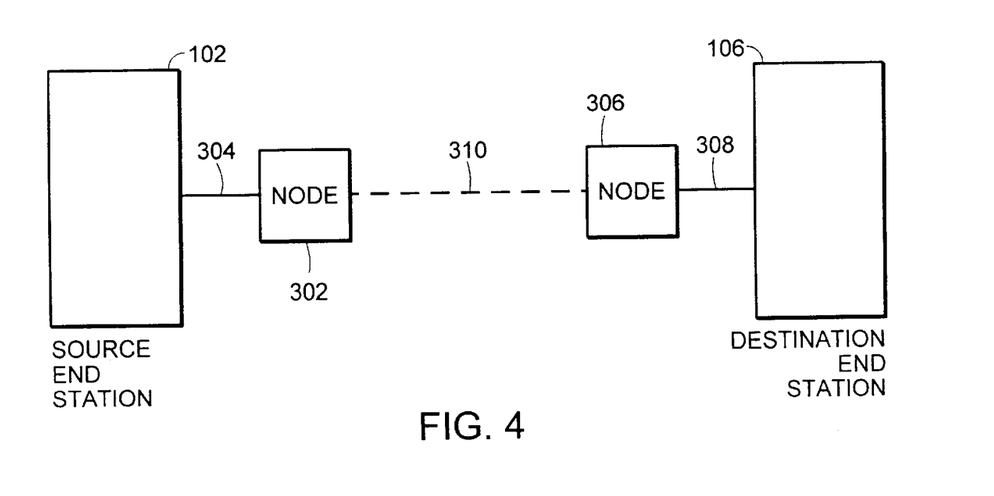
FIG. 4 is a diagram of a virtual circuit between a source end station and a destination end station, showing intermediate nodes.

Turning now to FIG. 4, there is shown a partial network having a source end station 102 and a destination end station 106. Source end station 102 is attached to intermediate node 302 by link 304. Link 304 is the physical connection between end station 102 and intermediate node 302, and link 304 may be, for example, a telephone wire connection, an optical fiber connection, a twisted pair wiring connection, a coaxial cable, a microwave link, . . . etc. Link 304 may support one or more virtual circuits VC1 112, VC2 114, VC3 116, . . . VCN 118.

Destination end station 106 is connected to intermediate node 306 by link 308. Again, link 308 may be, for example, a telephone wire connection, an optical fiber connection, a twisted pair wiring connection, a coaxial cable, a microwave link, . . . etc. Link 308 may support one or more virtual circuits VC1 112, VC2 114, VC3 116, . . . VCN 118.

In a small network, intermediate node 302 may be the same node as intermediate node 306. However in a large network, there may be many intermediate nodes in path 310 shown linking intermediate node 302 with intermediate node 306. Path 310 linking intermediate node 302 with intermediate node 306 is shown as a dashed line to indicate the great variety of network arrangements which can be indicated by intermediate node 302 and intermediate node 306, where the variety is from intermediate nodes 302 306 being one node, to path 310 passing through many additional intermediate nodes.

Figure 5:
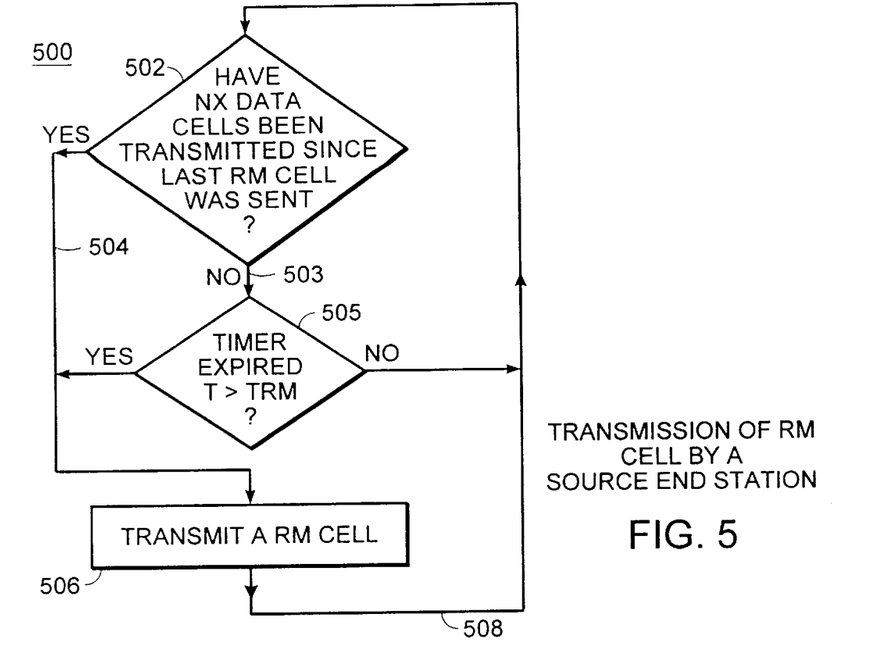
FIG. 5 is a flow diagram of a process for transmitting a forward RM cell.

Turning now to FIG. 5, there is illustrated process 500, where process 500 runs in a source end station 102, and process 500 controls transmission of a Resource Management Cell, a RM cell.

In an exemplary embodiment of the invention shown in FIG. 5, there is disclosed a proportional scheme with a maximum time interval between RM cell transmissions. By the term proportional scheme, it is meant that an RM cell is transmitted after a predetermined number of data cells, but at least once every "maximum time interval".

At block 502 the number of data cells transmitted since the last RM cell transmission are counted, and in the event that NX data cells have been transmitted since the last RM cell was sent, the process branches along path 504 to block 506. At block 506 an RM cell is transmitted. If fewer than NX data cells have been transmitted since the last RM cell transmission, then the process branches to path 503, where process 500 goes to block 505.

At block 505 a timer is allowed to run free until the time, represented by T, equals a exceeds a fixed time TRM. The time TRM is a parameter input to the source end station 102. While time equal to TRM has not expired, the test of block 505 answers "no", and the process returns on path 508 to block 502 in order to continue counting the number of data cells transmitted. In the event that the test of block 505 answers "yes", the timer has expired, and process 500 goes to block 506.

At block 506 the source end station 102 transmits a RM cell. After transmission of a RM cell, the process 500 follows path 508 and returns to block 502 where the process continues to count RM cells, and to monitor the timer of block 505 in order to make the decision to transmit another RM cell.

Blocks 502 and 505 comprise a double loop for transmitting an RM cell either after the transmission of NX data cells, or after expiration of the source station timer by the timer exceeding time interval TRM, if NX data cells have not been transmitted during the last TRM time interval.

In an exemplary embodiment of the invention, NX may be 32 data cells, or alternatively in another exemplary embodiment of the invention, NX may be 64 data cells, etc. Further, any rule may be employed for transmitting a number of RM cells relative to the number of data cells which are transmitted. In any event, after expiration of TRM, an RM cell is transmitted by the source end station by the process following path 504.

In general, each source end station may have a different value for the parameter TRM. In the following discussion, it is assumed that each source end station may, but need not, have a different value of the time parameter TRM. However, in each source end station, an RM cell is transmitted by process 500 after expiration of that source end station's TRM, or after transmission of NX data cells.

Further, a source end station may change the period at which it transmits a RM cell, and therefore change its value of TRM.

Figure 6:
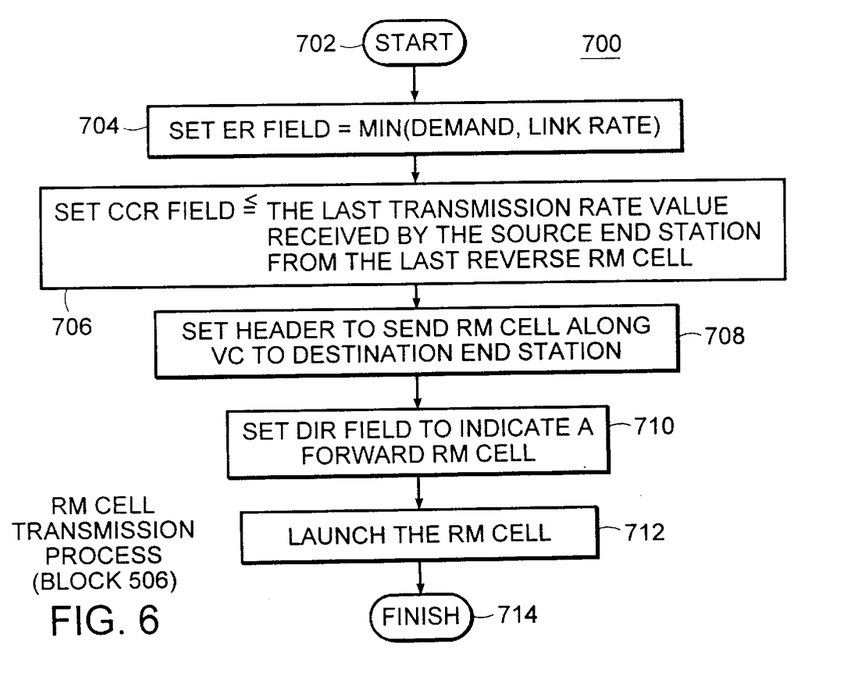
FIG. 6 is a detail flow diagram of a process for transmitting a forward RM cell.

Turning now to FIG. 6 there is shown process 700, where process 700 is the RM cell transmission process which operates within block 506 of process 500. Block 506 transmits the RM cell by the source end station 102.

At block 702 process 700 starts when process 500 enters block 506. From block 702, process 700 enters block 704. At block 704, the value of field ER 302 is set equal to the smaller of the contents of demand field 706 or Link Rate field 708. Accordingly, the contents of ER field 302 are set to the Max-Min transmission rate which the source end station wants, either by the demand value, or limited by the bandwidth of the link 304 connecting the source end station 102 to the network. Process 700 then proceeds to block 706.

At block 706 the CCR field 304 of the RM cell is set equal to, or less than, the last value of the transmission rate delivered to the source end station by the last reverse RM cell to be received by the source end station. That is, the source end station places the last feedback value from the network in the CCR field 304 of the outgoing RM cell.

In an alternative embodiment of the invention, the source end station may set the CCR field to:

MIN( current transmission rate+increase factor, the value of ER received in the last feedback RM cell)
as for example in the ATM Forum UNI 4.0 Specification.

At block 708, process 700 sets the header of the RM cell so that the RM cell travels along the proper virtual circuit to the destination end station 106. Process 700 then goes to block 710.

At block 710 process 700 sets the DIR field to indicate that the RM cell is a forward RM cell travelling from a source end station to a destination end station. Process 700 then goes to block 712.

At block 712 the RM cell is launched onto link 304 so that it will travel through the virtual circuit to destination end station 106. Process 700 then goes to block 714 where it finishes, and process 500 exits from block 506.

Figure 7:
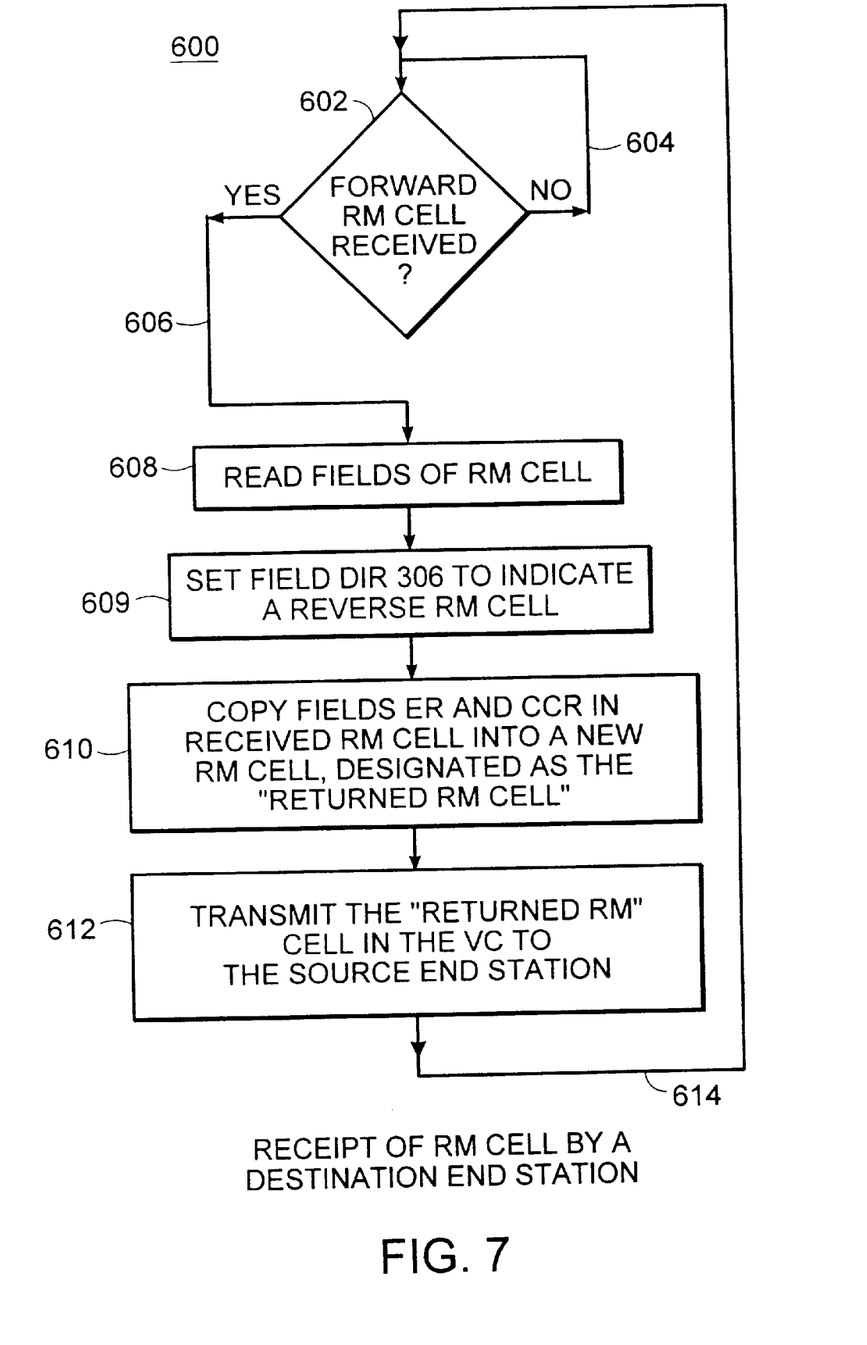
FIG. 7 is a flow diagram showing receipt of a forward RM cell by a destination end station.

Turning now to FIG. 7, there is shown process 600 for receipt of an RM cell by a destination end station. A VC is established between a definite source end station 102 and a definite destination end station 106, and the RM cell transmitted by process 500 operating in the source end station 102 is directed along the VC to the destination end station 106. Test block 602 tests to determine if an RM cell has been received by the destination end station. In the event that no RM cell has been received, the process returns along path 604 to continue waiting for receipt of an RM cell.

Upon receipt of a forward RM cell by the destination end station 106, block 602 answers "yes" and the process goes along path 606 to block 608. At block 608 the process reads the fields of the detected RM cell. At block 609 the process sets the field DIR 306 to indicate a reverse RM cell. At block 610 the ER and CCR fields of the detected RM cell are copied into the reverse RM cell. Block 612 launches the reverse RM cell into link 308 in order to start the journey of the reverse RM cell to the source end station 102. Process 600 then enters path 614 where it returns to test block 602 in order to look for receipt of the next RM cell.

Response by an Intermediate Node to Receipt of an RM Cell

Figures 8A, 8B, 8C:
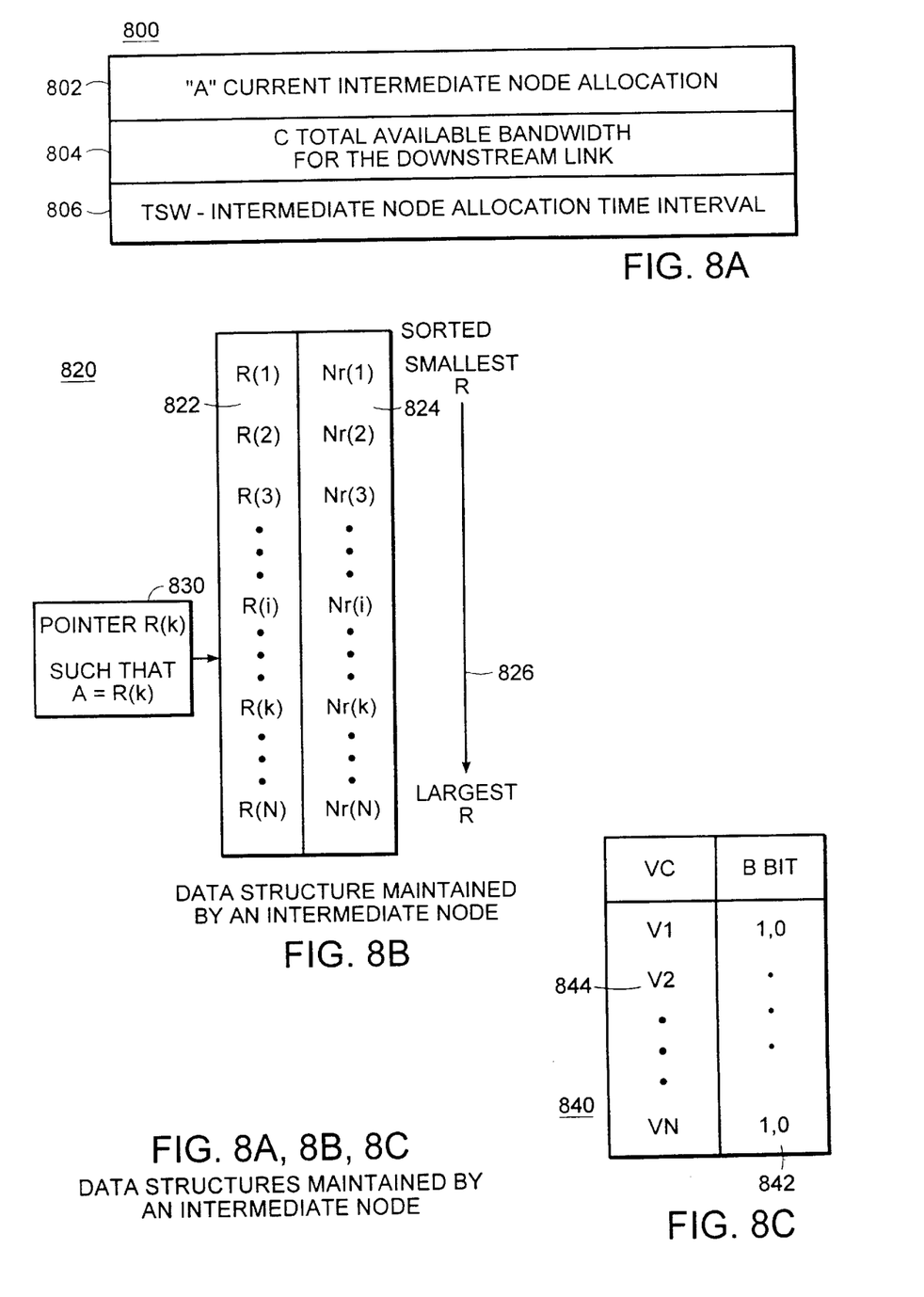
FIG. 8A is a field diagram of a data structure maintained in an intermediate node.
FIG. 8B is a field diagram of a data table maintained in an intermediate node.
FIG. 8C is a field diagram of a data table maintained by an intermediate node.

Turning now to FIG. 8A, there is shown a table of numerical parameters maintained by an intermediate node, for each of its outgoing links.

Field 802 contains the value of A, the current intermediate node rate allocation value, and A is calculated periodically by the intermediate node.

Field 804 contains the value of "C" the total available bandwidth for the outgoing link. The outgoing link may carry one or more virtual circuits.

Field 806 contains the value of TSW, the Intermediate Node Allocation Interval. TSW is the time interval between periodic calculation of the intermediate node rate allocation value A, as stored in field 802.

Turning now to FIG. 8B, there is a shown Table 820 having an entry 822 for each permitted transmission rate, and a second entry 824, Nr(i), showing the number of VCs using that particular transmission rate. The entry Nr(i) 824 gives the number of VCs using the transmission rate indexed by i.

In the event that the network is established with, for example, 256 transmission rates, there will be 256 entries in Table 820. Thus in this example, with only 256 entries in Table 820 of FIG. 8B, the transmission rates available for end stations and intermediate nodes have a dynamic range from 1 to 4.3 thousand million ($10^9$). In other exemplary embodiments, a different expression may be used to compute the available rates used in Table 820 of FIG. 8B, to give different values of the rates.

In an implementation in an intermediate node, it is not necessary to keep entry 822 giving the permitted transmission rate, as it can be calculated from the index i of the transmission rate. However, entry 822, giving the permitted rate is shown in FIG. 8B in order to make this discussion more clear.

Arrow 826 indicates that the values of the transmission rates R(i) 822 are sorted in ascending order, with R(1) being the smallest transmission rate, and R(N) being the largest transmission rate.

Pointer 830 points to an entry in Table 820. Pointer 830 points at the entry substantially equal to the intermediate node rate allocation value A 802. The transmission rate allocation value is shown computed at a high level in FIG. 2, and in more detail with reference to FIG. 11. The value of the pointer is an integer which refers to an index i in Table 820 given by the expression:

$$k = \text{Index}(A)$$

The pointer has value k. That is, k is the index of the rate entry in Table 820 which is equal to the value of A, as A is rounded down to the nearest discrete rate.

Since the entries in Table 820 are sorted, entries having an index i from 1 to k-1 are smaller transmission rates R(i) 822 than the value of A. Also, entries of transmission rates R(i) in Table 820 having index i from k to N are greater than, or equal to, the value of A. The value of Index(A) plays an important role in computing A, as described with reference to FIG. 11.

Turning now to FIG. 8C, there is shown a Table 840 having an entry for each VC passing through the intermediate node. A single bit entry 842, where the bit is referred to as the B-bit, is provided for each VC. The B-bit is set to "1" if an RM cell has been received during the current intermediate node allocation interval TSW, and is set equal to "0" in the event that no RM cell has been received for that particular VC during the current intermediate node allocation interval TSW.

Figure 9:
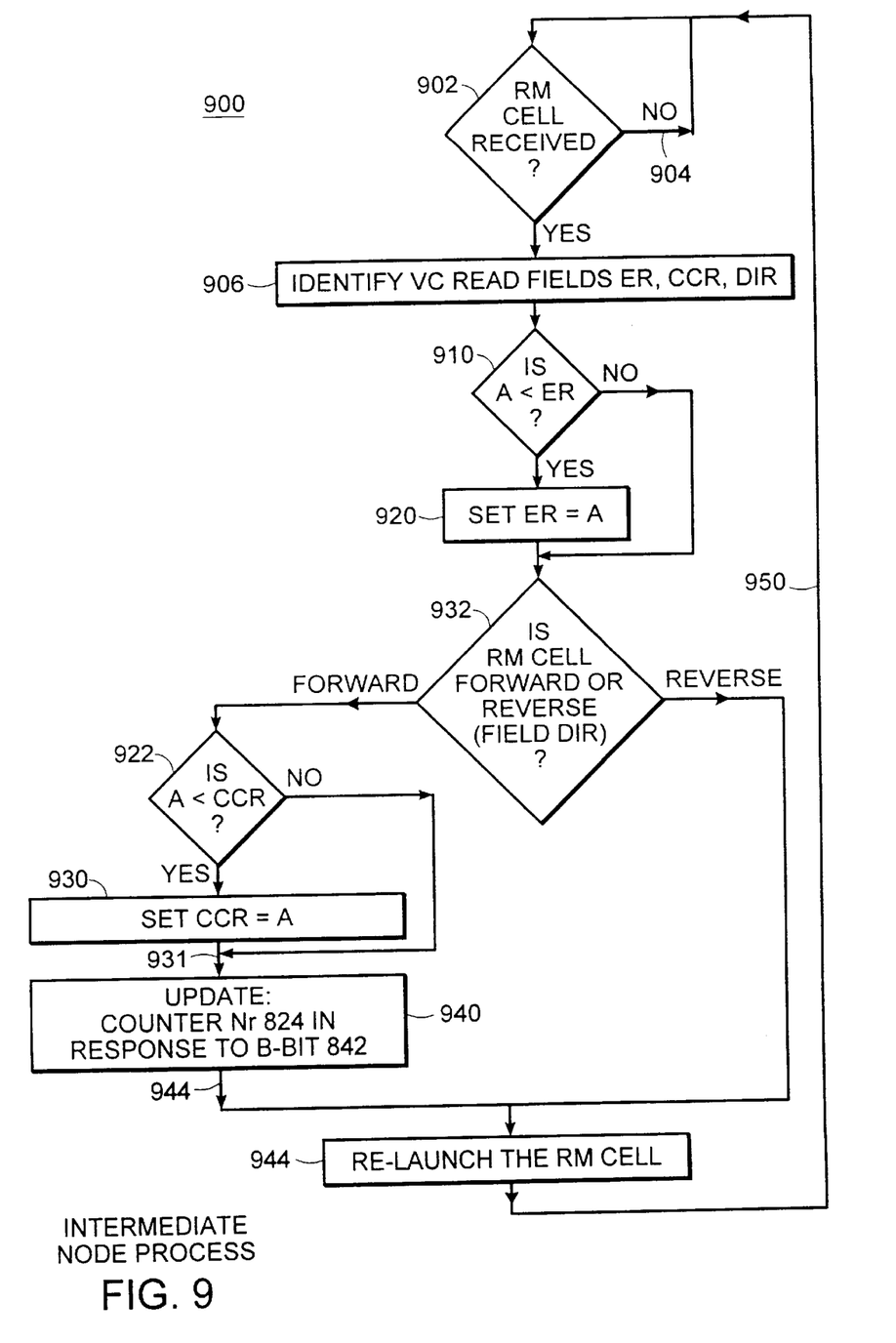
FIG. 9 is a flow diagram of a process operating in an intermediate node.

Turning now to FIG. 9, there is shown process 900 which an intermediate node executes upon receipt of an RM cell.

At block 902 the process 900 determines if an RM cell has been received. In the event that no RM cell has been received, the process takes path 904 to continue waiting for receipt of an RM cell. In the event that an RM cell has been received, process 900 goes to block 906.

At block 906 fields ER 302, CCR 304, and DIR 306 of the received RM cell are read. Process 900 then proceeds to block 910.

At block 910 process 900 tests the value of A against the value read from the ER field of the RM cell. The value of A is the rate allocation value for the intermediate node, and is stored in field 802 of FIG. 8A. If the value of A is smaller than the value read from the ER field, then process 900 goes to block 920. In the event that the value of A is not less than the value read from ER field 302, then process 900 skips block 920 and goes to block 932.

Figure 9A:
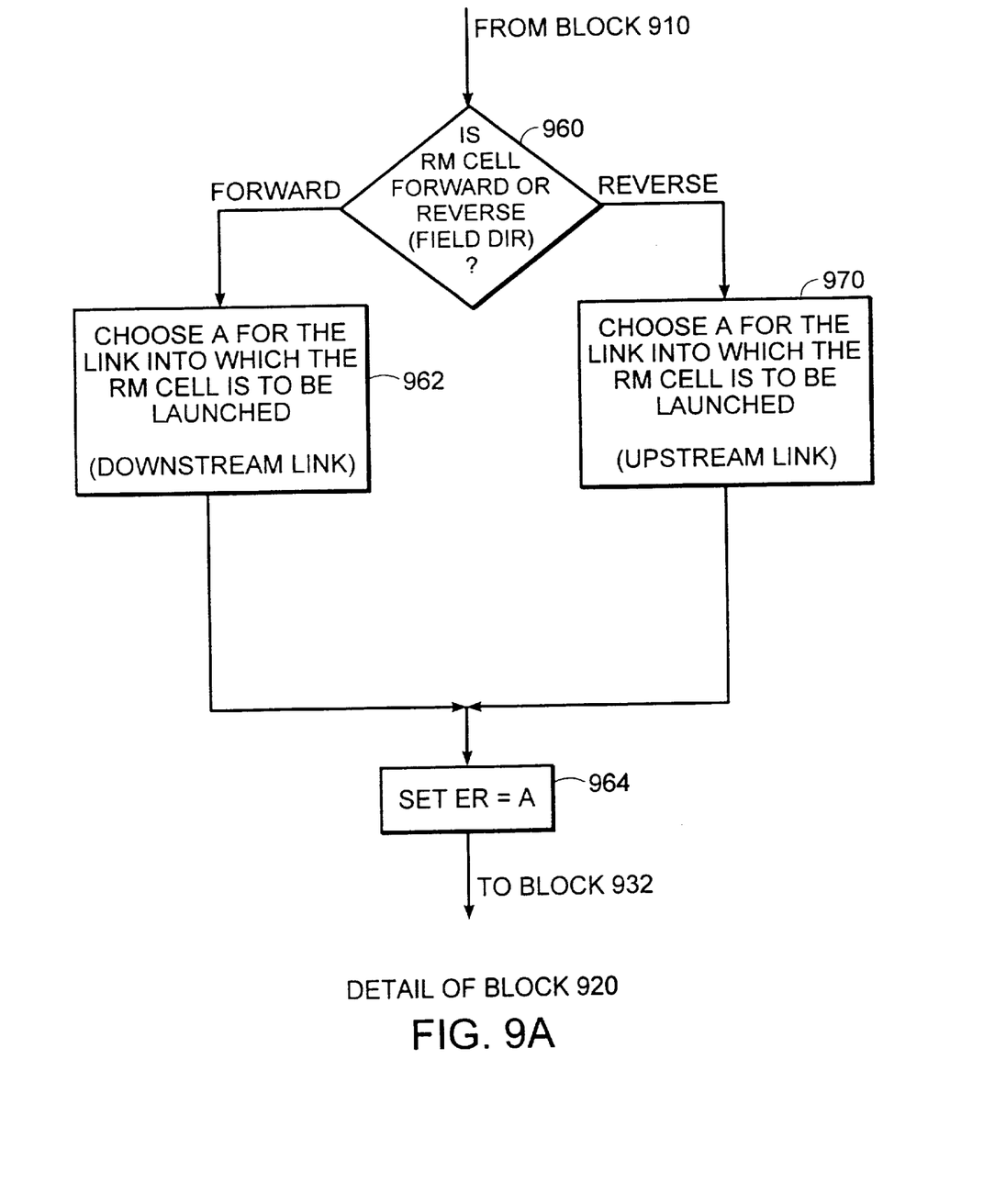
FIG. 9A is a detail flow diagram of box 920.

Turning now to FIG. 9A, there is shown a flow diagram of detail within block 920. Coming from block 910, the process enters block 960. At block 960 it is determined whether the RM cell is a forward RM cell, or a reverse RM cell by examining field DIR 306.

The rate allocation value A is computed periodically with time period TSW for each link, as is described with reference to FIG. 11, hereinbelow. The values of A for different links are used as described next with reference to blocks 962 and 970.

In the event that the RM cell is a forward RM cell, the process goes to block 962. At block 962 there is chosen the downstream link rate allocation value A. For example, as shown in FIG. 3, for intermediate node 302 the downstream link is link 310. And for intermediate node 306, the downstream link is link 308. From block 962, the process goes to block 964. At block 964 the value of field ER in the RM cell is set equal to the value of A chosen at block 962.

In the event that the RM cell is a reverse RM cell, the process goes to block 970. At block 970 the value of rate allocation value A for the upstream link is chosen. For example, as shown in FIG. 3, for intermediate node 306 the upstream link is link 310. And for intermediate node 302 the upstream link is link 304. From block 970 the process goes to block 964. At block 964 the value of field ER in the RM cell is set equal to the value of A chosen at block 970.

Returning now to FIG. 9, at block 920 a new lower value is written into ER field 302 of the RM cell, where the new value is =A. This step accomplishes the purpose of writing the current rate allocation value into field ER 302 of the RM cell. Eventually, the RM cell will arrive back at the source end station which launched it, and the ER field will give the source end station a permissible rate at which the source end station may transmit. Process 900 then goes to block 932.

At block 932 it is determined whether the received RM cell is a forward RM cell or a reverse RM cell. In the event that the received RM cell is a forward RM cell, process 900 goes to block 922. For a reverse RM cell, process 900 goes to block 944.

At block 922 process 900 tests the value of A against the value read from the CCR field 304 of the received RM cell. In the event that the value of A is less than the value read from the CCR field, process 900 goes to block 930. In the event that value of A is not less than the value read from the CCR field 304, then process 900 skips block 930 and goes to block 934.

At block 930 the value of the field CCR 304 in the RM cell is changed to a lower value. Process 900 then goes to block 940.

Figure 10:
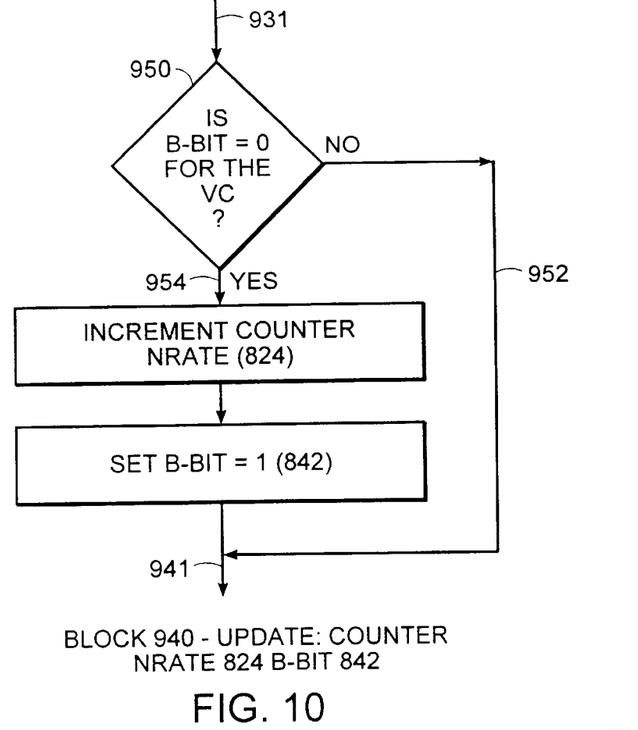
FIG. 10 is a flow diagram of a detail in the process of FIG. 10.

Turning now to FIG. 10, detail of block 940 is shown. At block 940, counter Nr 824 and the B-bit 842 are updated. From path 931 the process enters branch block 950, where the value of B-bit 842 for the VC identified at block 906 is tested. In the event that the B-bit 842 for the VC identified at block 906 is not = 0, then the process branches to path 952, because this RM cell is not the first RM cell for that VC detected during the current switch TSW time interval.

In the event that the B-bit 842 is 0, then this RM cell is the first RM cell detected for this VC during the current switch TSW time interval, and the process goes along path 954 to block 956. At block 956 the counter Nr(i) 824 corresponding to the value of CCR in the outgoing RM cell is incremented by 1, and the corresponding B-bit is set = 1 at block 958. Incrementing the counter Nr(i) 824 tells the intermediate node that another VC is. using the transmission rate i, where i corresponds to the value of the CCR field 304 in the RM cell after it is transmitted by the intermediate node. The value of the field CCR 304 used to identify the transmission rate indexed by i is determined at block 930, as either the value read from the CCR field 304 of the RM cell as it was received, or the lower value to which the CCR field 304 was updated at block 930. The counter is not incremented when the B-bit is not equal "0" in order to avoid counting the VC twice, or multiple times during one switch allocation time interval TSW 806.

Counter Nr 824 keeps track of the number of VCs having the rate written into the CCR field of the forwarded RM cell.

The purpose of the B-bit is to prevent counters Nr 824 from multiple counting the VC in the event that more than one RM cells arrive on that VC during one Intermediate Node allocation time interval TSW. Process 900 then goes to block 944 along path 941.

In an alternative embodiment of the invention, intermediate nodes do not reduce the value written into the CCR field 304. In such an alternative embodiment, the source end stations will iterate to stable transmission rates, but more iteration steps will be required. More iteration steps will be required because intermediate nodes do not receive the most up-to-date bottleneck information in their RM cells. In this alternative embodiment process 900 would simply skip block 922 and block 930, and so go from block 932 to block 940.

Returning to FIG. 9, at block 944 the new RM cell is launched on the appropriate link. In the event that the RM cell is a forward RM cell, the RM cell is launched on the downstream link (link 310 for node 302, link 308 for node 306). In the event that the RM cell is a reverse RM cell, the RM cell is launched into the upstream link (link 310 for node 306, link 304 for node 302).

Process 900 then takes path 950 and returns to block 902 where it waits for receipt of another RM cell.

Action of a Source Node Upon Receipt of a Reverse RM Cell

Upon receiving a reverse RM cell, the source determines if its rate needs to be adjusted based on the feedback received in this reverse RM cell.

Calculation of Current Intermediate Node Rate Allocation Value A

The switch performs the following rate allocation value algorithm to achieve Max-Min fairness.

Figure 11:
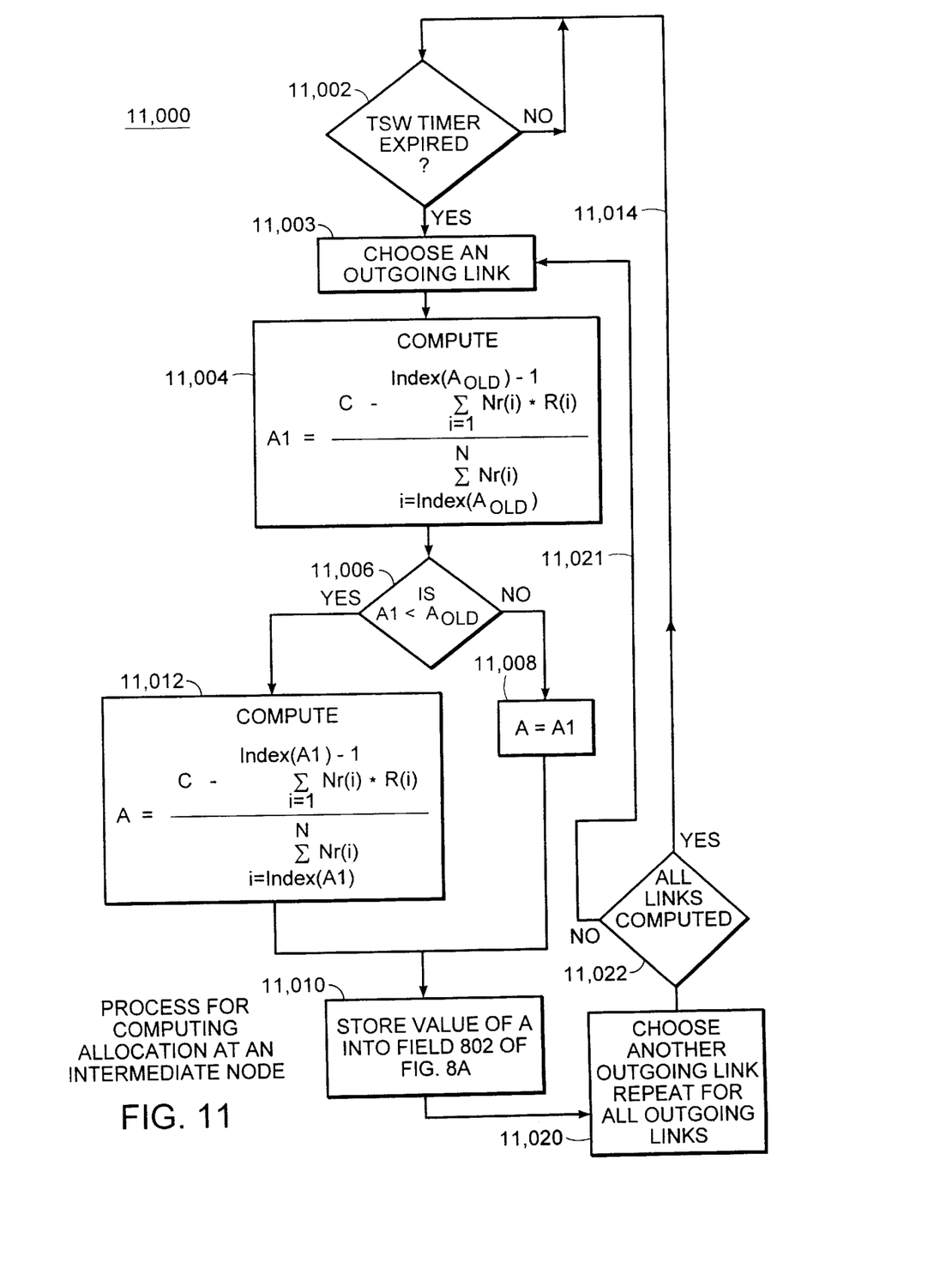
FIG. 11 is a second flow diagram of a process operating in an intermediate node for calculating a rate allocation value.

Turning now to FIG. 11, there is shown a Current Allocation Process 11,000 operating asynchronously and concurrently with other processes in an intermediate node. The purpose of process 11,000 is to perform a Rate Allocation Value calculation for the intermediate node on a periodic basis for the calculation of the value of Rate Allocation Value A stored in field 802 of FIG. 8A.

In a preferred embodiment of the invention, the computation of Max-Min fairness is performed periodically, once every switch allocation interval. In general, the allocation interval may be different for different switches, and the allocation interval may vary with time at any switch. Let C be the capacity (in cells/second or bits/second) and R_Requested be the requested rate by a flow for a given link. To determine the new allocation, the switch partitions the set of flows into two subsets: flows whose rate is below the current allocation "AR old", referred to as "restricted set" R, and all other flows, referred to as "unrestricted set" U. All the flows with rates below the current allocation (because they either have a lower demand or are restricted by a different link), are given their requested share of the link bandwidth. The other flows (whose demands are higher) are then provided a fair share of the remaining bandwidth.

The partition of Table 820 into a set having transmission rate values R(i) 822 less than the value of A is accomplished by taking those having an index i between 1 and "k-1" of pointer 830 shown in FIG. 8B. And the set having rate values equal to or greater than A are those having an index i value from k to N, also as shown in Table 8B.

Processes 11,000 idles in block 11,002 until expiration of time interval TSW, at which time process 11,000 goes to block 11,003.

At block 11,003 the process chooses an outgoing link for calculation of the rate allocation value A. The process then goes to block 11,004.

TSW field 806, shown in FIG. 8A, contains the value of the Intermediate Node Allocation Interval. TSW is a time interval used to time a periodic re-calculation of a new value of A, the Current Intermediate Node Rate Allocation Value. The value of A is used to assign to source end stations the transmission rate for a VC. All RM cells received during a time interval TSW are assigned an Intermediate Node Rate Allocation Value of the last calculated value of A. The RM cells may be received in multiple numbers of VCs. The last calculated value of A is used in Process 900 as the Intermediate Node responds to receipt of an RM cell in any VC.

The assignment of a transmission rate to a source end station is accomplished through writing the value of A into the RM cell as shown in Process 900, as illustrated in FIG. 9.

At block 11,004 process 11,000 calculates a value of A1. A1 is calculated using the expression:

$$A1 = \frac{C - \Sigma Nr(i) * R(i), \text{ for all } i \text{ such that } R(i) < A(old)}{\Sigma Nr(i), \text{ for all } i \text{ such that } R(i) \geq A(old)} \quad \text{Equation 1}$$

The sums in Equation 1 are over the entries in Table 820 of FIG. 8B. The value A(old) is the rate allocation value A currently stored in field 802 of FIG. 8B. The value A(old) is the value of A at the intermediate node just before expiration of the present time period TSW. The index k shown in FIG. 9 is:

k=Index( A(old) )

Process 11,000 then goes to block 11,006. At block 11,006 the value of A1, computed in block 11,004, is tested against the old value of A(old). In the event that A1 is not less than A(old), the process goes to block 11,008. At block 11,008 the value of A is set equal to the value of A1 computed in block 11,004. The process then goes to block 11,010.

In the event that the value of A1 is less than A(old), the process at block 1106 answers "yes", and the process branches to block 11,012.

At block 11,012 a new value of rate allocation value A is computed using the value of A1 computed in block 11,004, using the equation:

$$A = \frac{C - \Sigma Nr(i) * R(i), \text{ for all } i \text{ such that } R(i) < A1}{\Sigma Nr(i), \text{ for all } i \text{ such that } R(i) \geq A1} \quad \text{Equation 2}$$

The process then goes from block 11,012 to block 11,010.

The form of Equation 2 shown in block 11,004 and block 11,012 takes the sums over the index i shown in Table 820, and uses the value of A to calculate the index as:

Index(A).

At block 11,010 process 11,000 stores the current value of A into memory, for example into field 802 of FIG. 8A. The rate allocation value A stored at block 11,010 into field 802 is then used in responding to receipt of subsequently received RM cells by the Intermediate Node.

Upon completion of block 11,010, then process 11,000 goes to block 11,020. At block 11,020 and block 11,022 the process 11,000 repeats the calculation for all outgoing links served by the intermediate node by returning along path 11,021 to block 11,003. Another link is chosen at block 11,003 for the calculation of the rate allocation value A.

In the event that all outgoing links of the intermediate node have had their rate allocation value A computed, the process returns along path 11,014 to block 11,002 to wait for the next expiration of the time interval TSW. Upon the next expiration of time interval TSW, process 11,000 then proceeds to block 11,003, and subsequent blocks, and again recalculates the value of A, the node rate allocation value for each outgoing link served by the intermediate node.

The total number of active VCs is given by the sum:

$$N = \Sigma[Nr(i)] \text{ all } i \qquad \text{Equation 3}$$

TSW, the Intermediate Node Allocation Time Interval May Vary with Time

Figure 12:
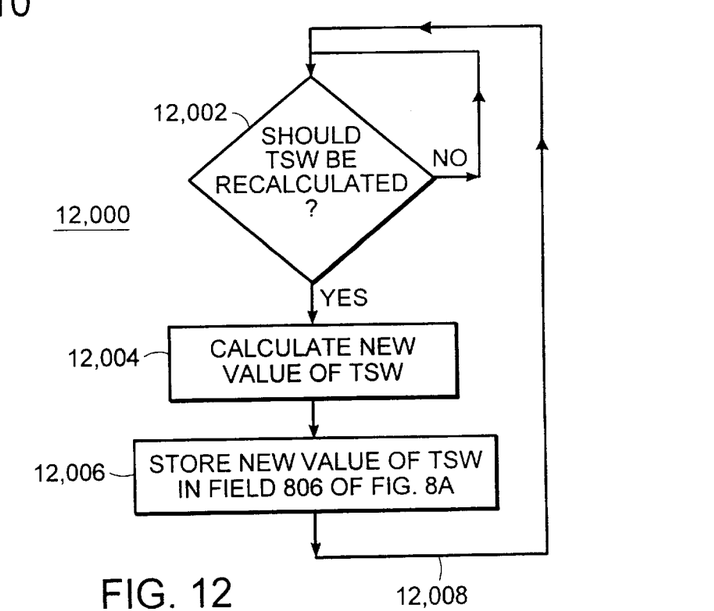
FIG. 12 is a flow diagram of a process operating in an intermediate node, for changing the switch re-calculation time interval.

Referring now to FIG. 12, there is shown process 12,000 which can change the value of TSW, the intermediate node allocation time interval. The value of TSW is used in block 11,002 in order to time the periodic re-calculation of A, the Intermediate Node Rate Allocation Value.

At block 12,002 process 12,000 idles until it is determined that the value of TSW should be re-calculated. This invention does not involve determining whether or not the value of TSW should be re-calculated. The present invention encompasses a mechanism for allowing TSW to vary with time, and provides a method by which source end station transmission rates are adjusted to maintain feasibility of transmission rates in the network.

Further, TSW may have a different value for each intermediate node in the network. In the event that there are several thousand (several 1,000s) of intermediate nodes in the network, each intermediate node may have a different value of TSW, and each of these values of TSW may vary with time. The present invention provides a stable convergence of the transmission rates of source end nodes for all reasonable values of TSW in intermediate nodes. Upon a determination that the value of TSW should be recalculated, process 12,000 goes to block 12,004.

At block 12,004 process 12,000 calculates a new value of TSW, the intermediate node allocation time interval. Process 12,000 then goes to block 12,006.

At block 12,006 process 12,000 stores the new value of TSW in field 806 shown in FIG. 8A. This new value of TSW is then used for all subsequent re-calculations of A, the Intermediate Node Rate Allocation Value, as shown in process 11,000.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An apparatus to control transmission rates of a plurality of end stations in a computer network, the network having at least one intermediate node, the apparatus comprising:

said intermediate node having a plurality of virtual circuits passing therethrough, said virtual circuits established between said end stations;

said end stations transmitting data packets at a plurality of discrete transmission rates;

means for said end stations to transmit a data packet containing a field having transmission rate information;

means for said intermediate node to read said transmission rate information for said virtual circuits by said intermediate node detecting said transmission rate information in said field of a data packet received by said intermediate node;

means in said intermediate node for counting a number of virtual circuits using each said discrete transmission rate;

means in said intermediate node for maintaining an indication that a selected virtual circuit has been counted by said counting means, and for not counting said virtual circuit more than once during a switch time interval;

means in said intermediate node for calculating a rate allocation value for said plurality of virtual circuits; and means, by said intermediate node, for writing said rate allocation value into said field of said data packet in order to signal to said end station, and any intervening intermediate node, said rate allocation value calculated by said intermediate node calculating means.

2. An apparatus to control transmission rates of a plurality of end stations in a computer network, the network having at least one intermediate node, the apparatus comprising:

said intermediate node having a plurality of virtual circuits passing therethrough, said virtual circuits established between said end stations;

said end stations transmitting data packets at a plurality of discrete transmission rates;

a transmitter in each end station of said plurality of end stations to transmit a data packet containing a field having transmission rate information;

a receiver in said intermediate node to read this transmission rate information for said virtual circuits in said field of a data packet received by said intermediate node;

a counter in said intermediate node to count a number of virtual circuits using each said discrete transmission rate;

a status maintenance structure in said intermediate node to maintain an indication that a selected virtual circuit has been counted by said counter and to not count said virtual circuit more than once during a switch time interval;

a calculator in said intermediate node to calculate a rate allocation value for said plurality of virtual circuits; and a field writer in said intermediate node, to write said rate allocation value into said field of said data packet in order to signal to said end station, and any intervening intermediate node, said rate allocation value calculated by said calculator.

3. The apparatus as recited in claim 2, wherein said status maintenance structure further comprises:

a bit stored in said intermediate node for each said virtual circuit, each bit initialized to a first value at a beginning of a switch time interval, and said bit assigned to a second value when a data packet having transmission rate information is detected in said selected virtual circuit by said intermediate node.

4. The apparatus as recited in claim 3 further comprising:

a structure to not count a virtual circuit when said data packet is detected in a virtual circuit having said bit set to said second value.

5. The apparatus as recited in claim 3 wherein said first value of said bit is 0, and said second value is 1.

6. The apparatus as recited in claim 2 frther comprising:

each intermediate node in said network having a different switch time interval.

7. The apparatus as recited in claim 2 further comprising:

each end station having a different allocation time interval for timing the transmission of said data packets having transmission rate information.

8. A method of setting transmission rates for a plurality of virtual circuits established between a plurality of end stations, said virtual circuits passing through an intermediate node, said method comprising:

a) transmitting data packets by said end stations at a plurality of discrete transmission rates through said plurality of virtual circuits;

b) transmitting at least one data packet by at least one of said end stations, said data packet containing a field having transmission rate information;

c) reading, by said intermediate node, said transmission rate information in said field of a data packet received by said intermediate node, said transmission rate information for said virtual circuits;

d) counting, by said intermediate node, a number of virtual circuits using each said discrete transmission rate;

e) maintaining, in said intermediate node, an indication that a selected virtual circuit has been counted in step d), and for not counting said virtual circuit more than once during a switch time interval;

f) calculating, in said intermediate node, a rate allocation value for a selected virtual circuit, and g) writing, by said intermediate node, said rate allocation value into said field of said data packet in order to signal to a selected destination end station, and any intervening intermediate node, said rate allocation value calculated in step f).

9. The method as recited in claim 8 further comprising:

establishing, by said selected destination end station in response to said rate allocation value as read from a data packet received by said selected destination end station, a transmission rate for transmission by said selected destination end station of data packets over said selected virtual circuit.

10. The method as recited in claim 8 further comprising:

maintaining a bit in said intermediate node for each said virtual circuit, each bit initialized to a first value at a beginning of a switch time interval, and said bit assigned a second value when a data packet having transmission rate information is detected in said virtual circuit.

11. The method as recited in claim 10 further comprising:

not counting an identified virtual circuit when said data packet is detected in said identified virtual circuit having said bit set to said second value.

12. The method as recited in claim 10 further comprising:

assigning said first value of said bit to "0", and assigning said second value of said bit to "1".

* * * * *